United States Patent [19]
Schwartz

[11] Patent Number: 5,982,740
[45] Date of Patent: Nov. 9, 1999

[54] DRY BONDED DIGITAL VERSATILE DISC

[76] Inventor: Vladimir Schwartz, 50 Beharrell St., Concord, Mass. 01742

[21] Appl. No.: 08/845,628

[22] Filed: Apr. 25, 1997

[51] Int. Cl.$^6$ ....................................................... G11B 3/70
[52] U.S. Cl. ............................................................. 369/286
[58] Field of Search ..................................... 369/286, 288, 369/275.4, 275.5; 428/64.4

[56] References Cited

U.S. PATENT DOCUMENTS

| | | | |
|---|---|---|---|
| 4,450,553 | 5/1984 | Holster et al. | 369/286 |
| 5,759,332 | 6/1998 | Itoigawa et al. | 369/286 |

*Primary Examiner*—George J. Letscher
*Attorney, Agent, or Firm*—Godfrey & Kahn, S.C.

[57] ABSTRACT

A digital versatile disc ("DVD") for storing digital or digitized information that includes two sub-discs. Each sub disc has an outer peripheral edge, a top surface, a bottom surface, and a bore having a second peripheral edge. The two sub-discs are bonded together by a layer of dry film adhesive which is in contact with the bottom surface of the first sub disc and the top surface of the second sub-disc. The layer of dry film adhesive is spaced a distance from the second peripheral edges of the bores of the sub-discs. A weld located along the peripheral edges of the bores of the sub-discs provides bonding and structural support to the DVD. A hub or central area which is substantially free of any dry film adhesive is located between the weld and the layer of dry film adhesive. The use of a dry film adhesive to bond the component parts of the DVD eliminates many of the deficiencies of hot-melt and UV-curable adhesive bonding methods, particularly the problem of entrapping in the adhesive.

16 Claims, 5 Drawing Sheets

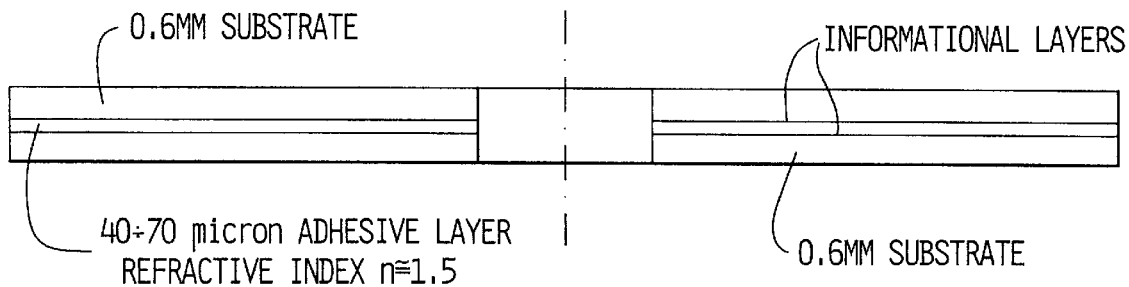
FIG_1
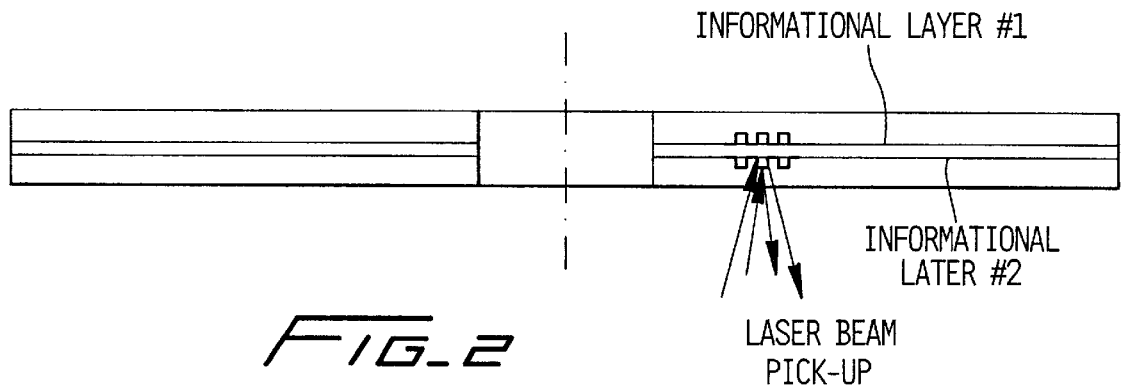
FIG_2
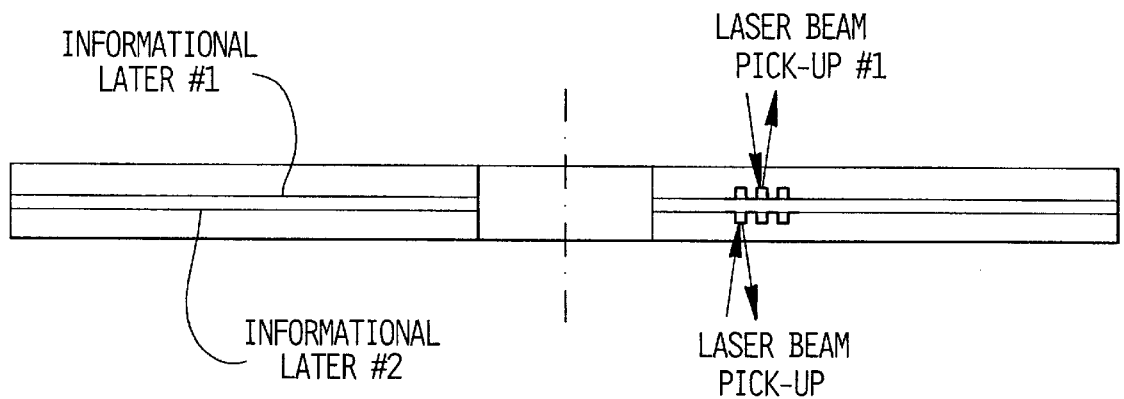
FIG_4

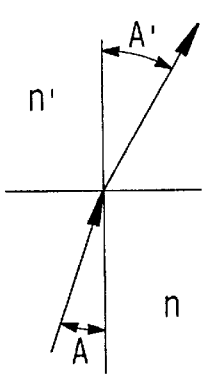 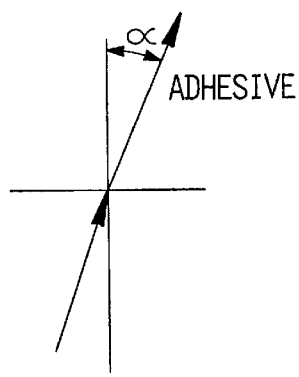 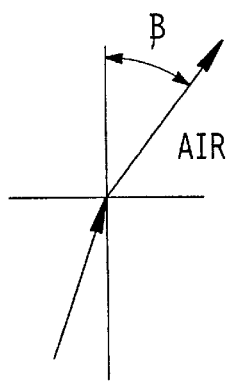
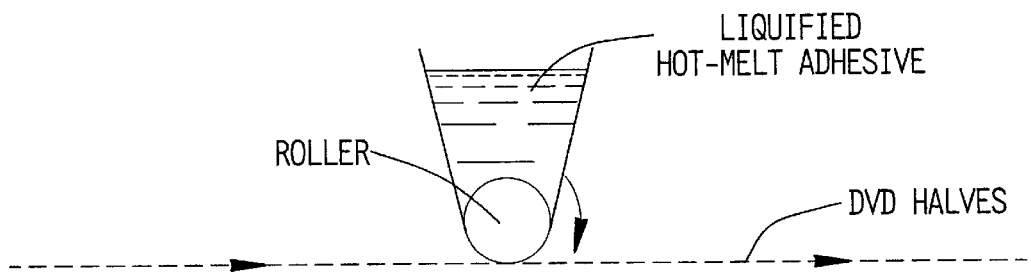
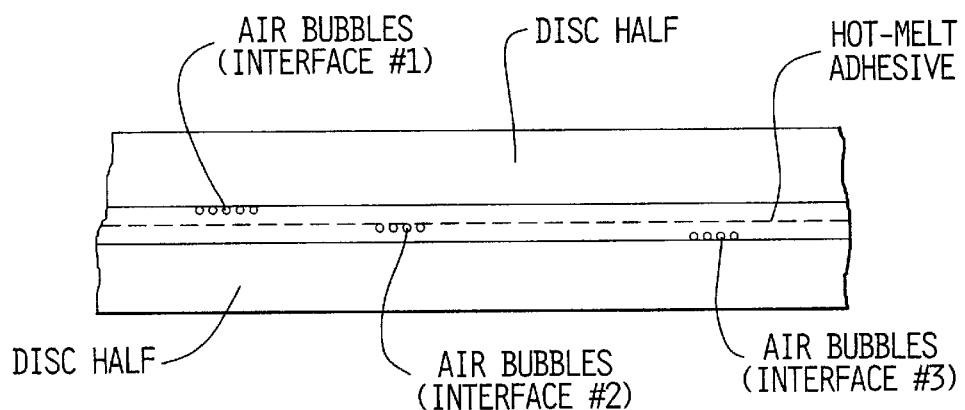

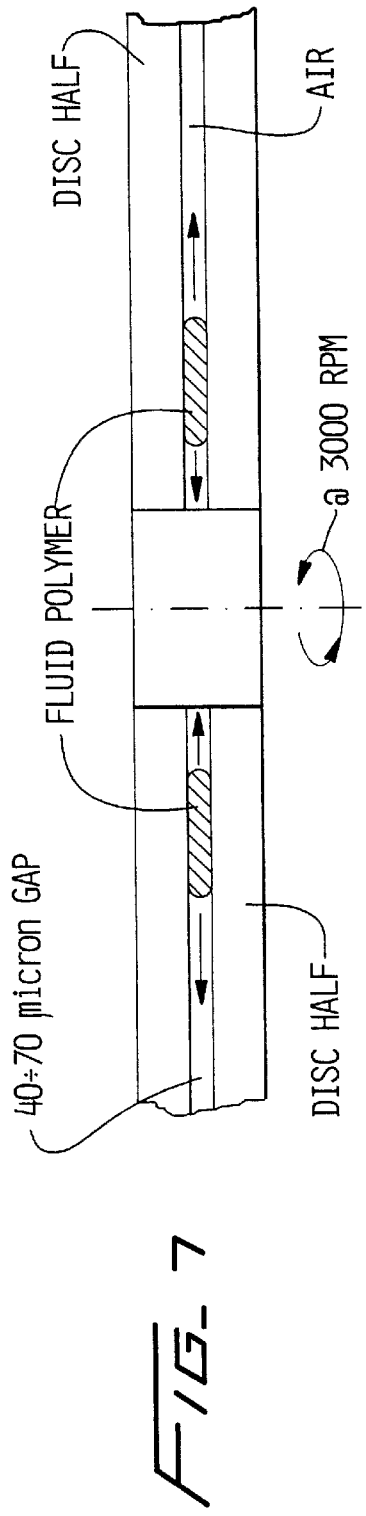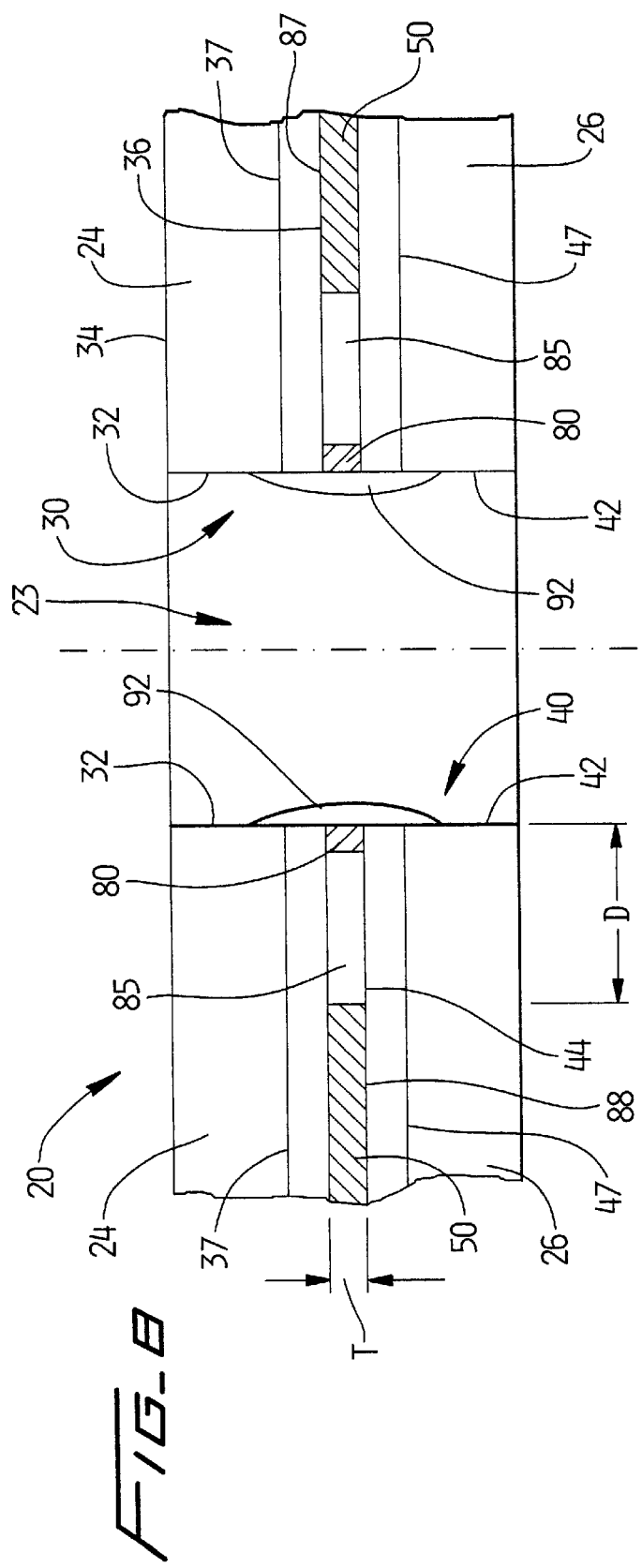

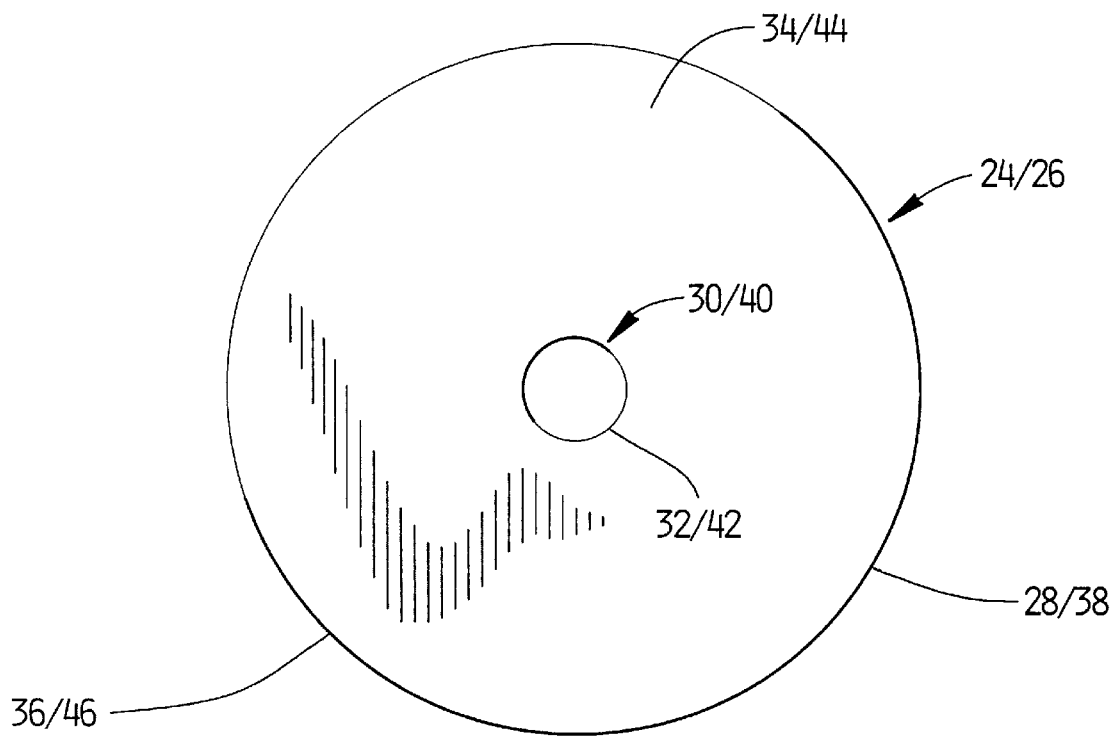
FIG_9
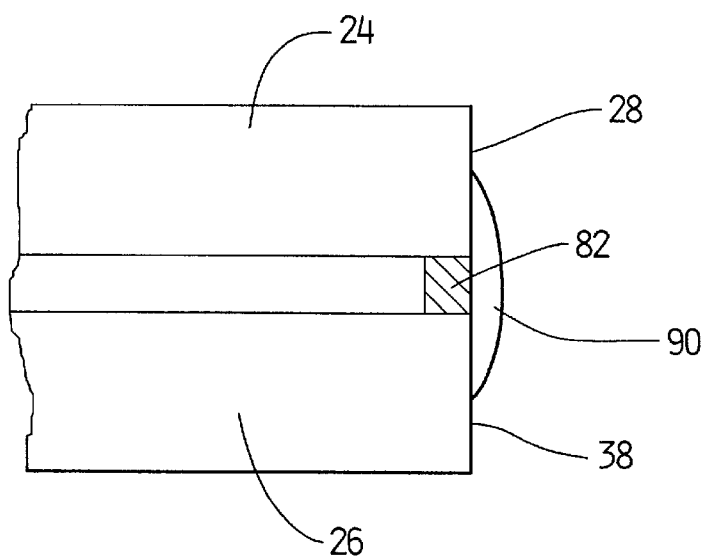
FIG_10

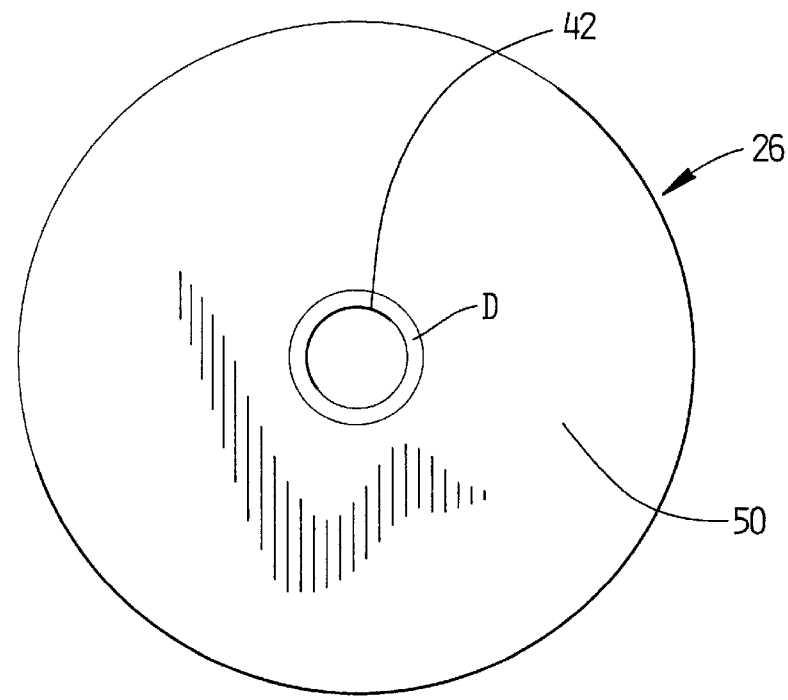
FIG_11
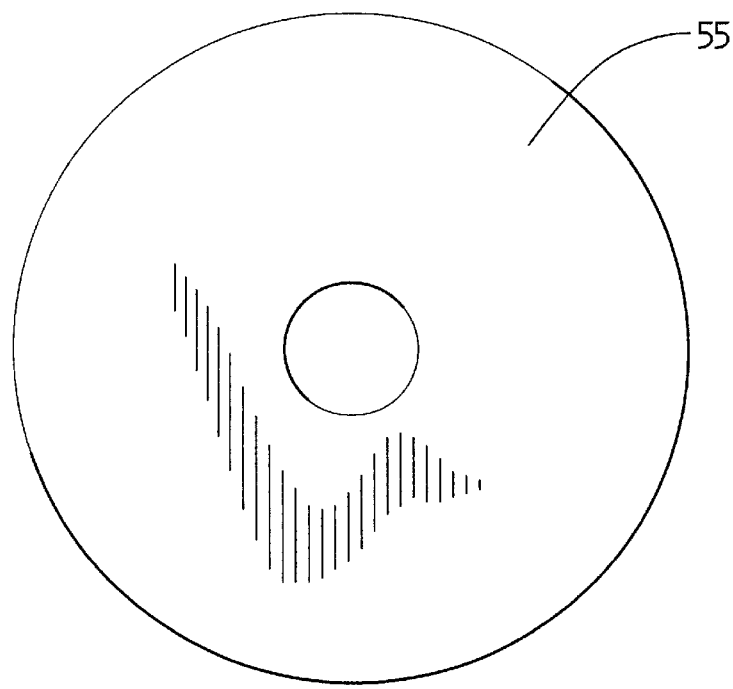
FIG_12

DRY BONDED DIGITAL VERSATILE DISC

FIELD OF THE INVENTION

The present invention relates generally to digital versatile discs ("DVDs"), which are used to store digital and digitized information such as computer software and video and sound recordings. More particularly, the present invention relates to the manufacture of DVDs and materials and methods for bonding the two component discs which form a single DVD.

BACKGROUND OF THE INVENTION

DVDs are used as a storage media for digital and digitized information. Presently, they are available in six formats: DVD-5 (5 Gbyte, prerecorded); DVD-9 (9 Gbyte, prerecorded; DVD-10 (10 Gbyte, prerecorded); DVD-18 (18 Gbyte prerecorded); DVD-R (3.8 Gbyte, recordable); and DVD-RAM (2.6 Gbyte read/write). Although, they are similar in appearance to better known compact discs or "CDs," DVDs are mastered in a different manner than ordinary CDs. Further, while CDs are made from a single substrate that is approximately 1.2 mm thick, DVDs are made from two component discs or "halves" made from optical grade polycarbonate. Each half is approximately 0.6 mm thick and 120 mm in diameter and the two halves are bonded together to form a DVD. An exemplary DVD is shown in FIG. 1. Among the advantages of DVDs over CDs is that each of the two halves may contain more than one information-carrying layer, thereby increasing storage capacity. In contrast, a CD has a single information-carrying layer.

While offering information capacity advantages over other storage media, a difficulty with DVDs is that their two halves must be bonded together. Presently, the two halves of a DVD are bonded in specialized machinery using liquid adhesives. In order to achieve an acceptable bond, the distance between the two DVD halves (i.e., the thickness of the intermediate adhesive layer) should be between 40 to 70 microns with a radial non-uniformity of about 4 microns (depending on the format specifications of the particular type of DVD being manufactured). DVDs must also be manufactured with a certain disc flatness or "tilt" (a tilt of 10 microns or more induces severe rotational disc vibrations rendering the DVD unreadable by its player). For discs in the DVD-9 format, an example of which is shown in cross section in FIG. 2, there are additional requirements.

One of the advantages of a DVD-9 disc is that its two informational layers are readable by a disc player from one side of the disc. However, in order for the disc player to read both informational layers, the laser beam from the pick-up must be able to travel through the intermediate layer of adhesive. Thus, the layer of adhesive must be optically clear and, specifically, it should be substantially transparent to radiation having a wave length from about 635 to about 650 nanometers (nm). Further, its refractive index (n) should be 1.5 to 1.6 and its single path bi-refringence should be between 30 nm to 50 nm (to be compatible with the optical grade polycarbonate of the two DVD halves).

As can be appreciated, air is often entrapped between the two halves of a DVD when it is manufactured. Yet, air bubble inclusions in the adhesive layer are not desirable and at a certain size are problematic. Air bubbles cause diversion of the disc player laser beam and even slight beam diversion can render a disc unreadable. Laser beam diversion is caused by the substantially different refractive index of air, n=1.003, versus the refractive index of polycarbonate, n=1.586. (The refraction of light at polycarbonate-air and polycarbonate-adhesive interfaces, accordingly to Snell's law, is shown in FIGS. 3B and 3C.) Air bubbles can also contribute to the delamination of a DVD's halves.

Each type of DVD has its own advantages and capabilities. Some disc formats, such as DVD-10 and DVD-9, have similar data storage capabilities. However, as can be seen by reference to FIG. 4, the informational layers in a DVD-10 disc are read from two sides of the disc. Thus, to make a DVD-10 disc comparable to a DVD-9 disc requires a dual laser beam pick-up DVD player. Such disc players are relatively expensive. On the other hand, the DVD-9 format offers the ability to have both informational layers read from one side of the disc, using a relatively inexpensive, single laser beam pick-up disc player. Thus, the DVD-9 format is one of the more attractive media for applications where an inexpensive disc player is used, but relatively large storage capacity is needed, such as, for example, interactive applications.

As noted, discs in the DVD-9 format have a relatively large capacity and can be used in inexpensive disc players. However, present DVD manufacturing methods are not satisfactory for manufacturing discs in the DVD-9 format. One method of forming a DVD disc is to use a hot-melt adhesive. As shown in FIG. 5, the hot-melt disc bonding method involves rubber-roller deposition of thermally liquefied, hot-melt adhesive to DVD halves. Adhesive is applied at 120° C. to 150° C. over the entire contact surface of both disc halves. In the next step, the DVD halves are pressed together to allow for uniform adhesion between the two halves (via a polymerization process). Since the disc halves are pressed together (against a flat surface), the desired disc flatness or tilt is easily achieved. However, one problem associated with DVDs formed using hot-melt adhesives is "droop."

DVDs can be exposed to high temperatures (for example, when they are on the dashboard of a car during the summer) and structural instability of the hot-melt adhesive bond can occur under such conditions. The structural instability manifests itself as a dimensional change or droop in the adhesive. Droop may cause the two halves of a DVD to become misaligned or may cause the spacing between them to become non-uniform. Droop of the hot-melt adhesive occurs at the glass transition temperature (or Tg point) of the material. The Tg point for typical hot-melt polymers is about 90° C. Sometimes structural welds are used in DVDs in order to diminish drooping. However, since the entire contact surfaces of the DVD halves are coated with hot-melt polymer, structural welding of discs to prevent disc droop via ultrasonic welding can not be achieved, because the adhesive bond prevents the necessary vibration. Structural welding using other welding methods may be available.

The hot-melt adhesive bonding method suffers from an additional problem; entrapment of air. As can be seen by reference to FIG. 6, entrapment of air bubbles can occur at the three interface layers of a hot-melt, adhesive-bonded DVD. Among other problems caused by the existence of such air bubbles, the entrapped air affects the cosmetic look of a DVD. In order to hide air-bubble-cosmetic defects that occur in the adhesive layer, translucent and even colored hot-melt adhesives are used. While some attempts to remove the air bubbles rather than hide them have been made, they have not been successful. Vacuum bonding (used to eliminate air bubbles during the bonding process) can not be applied when using hot-melt adhesives because liquefied thermopolymers actively "outgas" (transition from a liquid to a gaseous state), thus affecting the bond between the two halves. The outgased chemical substances also contaminate the vacuum pumping system. Accordingly, the hot-melt adhesive method does not satisfactorily meet the requirements of DVD-9 discs. That is, using this method, it is not feasible to produce a DVD with an optically clear adhesive layer that is free from entrapped air.

The other presently used method for bonding DVDs employs UV-curable adhesives. There are two ways of achieving a UV adhesive bond: radical UV and cationic UV. The radical UV method involves simultaneous spin coating and capillary dispersion of a UV-curable polymer between the DVD halves. The cationic method involves application of UV adhesive via a screen printing process. The cationic or screen printing method has limitations similar to those in hot-melt bonding (although, since cured UV fluid is hard and dimensionally stable even at temperatures above 100° C. there is no droop problem).

The radical UV method, which is illustrated in FIG. 7, requires extremely high quality, expensive DVD substrates (disc halves that have superior flatness, disc surface parallelity, and bonding surface wet-ability). Injection molding of substantially flat 0.6 mm polycarbonate substrates (including near perfect replication of data pits) is a complex and relatively "slow" process (6 to 7 seconds cycle speed). This makes the process relatively expensive and time-consuming rendering the radical UV method much less viable as a real option for most DVD formats.

Another difficulty with the radical UV method involves applying the UV-curable fluid polymer without entrapping air within it. Uniform capillary dispersion of fluid polymer with good "surface wiping" action to displace all air (bulk and surface level) while maintaining bonding layer thickness between the DVD halves is very difficult to achieve with present techniques. Efforts to improve dispersion of the fluid, including increasing the bonding surface energy of the DVD halves by an oxygen plasma pre-clean of the polycarbonate, maintaining fluid and disc temperature (to control constant viscosity of the polymer at approximately 30 to 40 centipoids), and maintaining low water content in the polymer require exacting control procedures and equipment. These complexities in combination with common UV-overcuring problems make the UV adhesive method very expensive and time consuming. However, the radical UV process is the only presently available method of manufacturing DVD-9 format discs.

Accordingly, it would be desirable to have a method and a system that overcomes these problems and by which the two halves of a DVD can be bonded together. Further, it would be desirable if the method and system were relatively simple and inexpensive.

OBJECTS AND SUMMARY OF THE INVENTION

Therefore, it is an object of the present invention to provide a method of bonding two halves of a DVD which overcomes the problems of the prior art.

It is another object of the present invention to provide a method of bonding two halves of DVD without hot-melt or UV-curable adhesives.

It is another object of the present invention to provide a method of bonding two halves of a DVD.

A further object of the present invention is to provide a DVD that is bonded with a dry film adhesive.

Yet another object of the present invention is to provide a method of bonding two halves of a DVD using a dry film adhesive.

A still further object of the present invention is to provide a method of using a dry film adhesive and welding to bond the two halves of a DVD.

These objects are achieved in a DVD that includes two sub-discs. Each sub disc has an outer peripheral edge, a top surface, a bottom surface, and a bore having a second peripheral edge. The two sub-discs are bonded together by a layer of dry film adhesive which is in contact with the bottom surface of the first sub-disc and the top surface of the second sub-disc. The layer of dry film adhesive is spaced a distance from the second peripheral edges of the bores of the sub-discs. A weld located along the peripheral edges of the bores of the sub-discs supplies additional bonding and structural support to the DVD. A hub or central area which is substantially free of any dry film adhesive is located between the weld and the layer of dry film adhesive.

The DVD is formed by arranging a layer of dry film adhesive between and in contact with the sub-discs and placing the dry film adhesive a distance away from the second peripheral edges of the bores of the sub-discs. Once the two sub-discs are placed together the weld is created along the peripheral edges of the bores of the first and second sub-discs. Preferably, the weld is created using an ultrasonic welder. The ultrasonic energy of the welder may also be used to vibrate the molecules in the adhesive. The vibration causes the temperature of the adhesive to rise and become thermally activated. A layer of polymer may be applied on the outer edges of the sub-discs as well as the peripheral edge of the bores in the sub-discs to seal the DVD from environmental contaminants.

These are just some of the features and advantages of the present invention. Many others will become apparent by reference to the detailed description of the invention taken in combination with the accompanying drawings.

BRIEF DESCRIPTION OF THE DRAWINGS

In the drawings:

FIG. 1 is a cross-sectional view of a DVD showing its two informational layers and a layer of adhesive between the two disc halves;

FIG. 2 is a cross-sectional view of a DVD-9 disc illustrating how one laser beam pick-up can read both informational layers in the DVD.

FIG. 3A is an illustration of Snell's law showing light refraction at an interface between two media;

FIG. 3B is an illustration of light refraction at the interface of polycarbonate and adhesive.

FIG. 3C is an illustration of light refraction at the interface of polycarbonate and air.

FIG. 4 is a cross-sectional view of a DVD-10 disc illustrating how two laser beam pick-ups are needed to read its two informational layers;

FIG. 5 is a diagrammatic illustration of rubber-roller deposition of hot-melt adhesive on DVD halves;

FIG. 6 is an enlarged, partial, cross-sectional view of a DVD manufactured using a hot-melt adhesive and showing air bubbles at the three interfaces of the DVD;

FIG. 7 is a partial, cross-sectional view of a DVD manufactured using a UV-curable adhesive;

FIG. 8 is an enlarged, partial, cross-sectional view of a DVD manufactured according to the teachings of the present invention;

FIG. 9 is a top plan view of one half of a DVD manufactured according to the teachings of the present invention;

FIG. 10 is another enlarged, partial, cross-sectional view of a DVD manufactured according to the teachings of the present invention and showing a layer of polymer on the outer peripheral edge of the DVD;

FIG. 11 is a top plan view of one half of the DVD of the present invention showing a layer of dry film adhesive applied thereto; and FIG. 12 is a top view of a thermo-plastic film adhesive cut in the shape of a DVD half.

DETAILED DESCRIPTION

A DVD 20 having a central bore 23 and two sub-discs or halves, namely a first half 24 and a second half 26, that are bonded together according to the teachings of present invention is shown in FIGS. 8, 9, and 10. The halves are substantially identical to one another. In particular, the half 24 includes an outer peripheral edge 28 (FIG. 10), a centrally positioned bore 30 that has a peripheral edge 32, an upper or top surface 34, a lower or bottom surface 36, and an informational layer 37. Similarly, the half 26 includes an outer peripheral edge 38 (FIG. 10), a centrally positioned bore 40 that has a peripheral edge 42, an upper or top surface 44, a lower or bottom surface 46, and an informational layer 47.

Each half is generally made from polycarbonate plastic that is approximately 0.6 mm thick and that has a diameter of approximately 120 mm. Each centrally positioned bore 30, 40 is designed to accept the centering pin (not shown) of a disc player (also not shown). Each informational layer 37, 47 is readable from one side of the disc 20 in a single laser beam pickup disc player.

The two halves 24 and 26 are bonded together, by and in contact with, a layer of dry film adhesive 50. It has been discovered that the dry film adhesive 50 may be a thermally activated adhesive similar to those used in the electronics and semiconductor industries for surface mounting (SMT) micro-electronic components, which heretofore have not been applied to the field of DVDs. Preferably, the dry film adhesive 50 should be produced by a continuous web process with precise film thickness. Such dry film adhesives are commercially available from a number of suppliers including, for example, Dynatex Intl., California which sells such adhesives under the brand name "WaferGrip" (Tg= 200° F., thickness 70+/−5 microns, paper or polyester backing). Other dry film adhesives that are suitable for use in the DVD 20 include those available from Bemis Associates Inc.—USA, Al Technology Inc.—USA, and Bostic—USA.

The dry film adhesive 50 is applied to the halves of the DVD 20 using automated or manual lamination techniques. As can be seen by reference to FIG. 11, the dry film adhesive 50 is die cut so that it has a toroidal shape with an inner surface 51. The dry film adhesive 50 is then placed on the second half 26. The other half of the DVD 20, the first half 24, is placed on top of the second half 26. The assembled components are then subjected to a heat source, such as by placing them in an oven, and the dry film adhesive is 50 is heated until it reaches a temperature of about 15° to 20° C. above the Tg point of the adhesive. After the assembly is heated, the dry film adhesive 50 is uniformly laminated between the first and second halves 24 and 26 by applying a vacuum to the assembly in known vacuum bonding equipment such as the "WaferBonder" sold by Dynatex Intl. in California.

In order to meet the requirements of the DVD-9 format, the dry film adhesive 50 is substantially transparent to light having a wave length of about 635 nm and about 650 nm. In addition, the dry film adhesive 50 has a thickness T of between about 55 μm and about 65 μm (micrometers). It is envisioned that other dry adhesives, in addition to the dry film adhesive 50, could be used in the present invention. In particular, instead of using the dry film adhesive 50, a double-sided dry adhesive product, with proper optical characteristics, could be used to bond the two halves 24 and 26. Such a product would include a substrate of plastic with adhesive on two sides of the substrate. A double-sided adhesive plastic product 55, as envisioned, is shown in FIG. 12.

It has been observed that like hot-melt adhesives, dry film adhesives manifest structural instability or droop at high temperatures. In order to prevent droop problems in the DVD 20, the inner surface 51 of the dry film adhesive 50 is positioned a distance D away from the peripheral edges 32, 42 and a weld 80 of the two halves 24 and 26 is made at the juncture of the bottom surface 36 and top surface 44 along the peripheral edges 32 and 42. Preferably, the distance D is about ⅜" so that a sufficient portion of each DVD half is free to vibrate upon the application of ultrasonic energy. The weld 80 is a structural element that ensures proper alignment of the two halves 24 and 26. A central hub 85, which is substantially free of any adhesive, is formed between the dry film adhesive 50 and the peripheral edges 32 and 42. The hub 85 follows the contours of the halves 24 and 26 and the inner source 51 of the dry film adhesive 50 and is, therefore, toroidally shaped.

Preferably, the weld 80 is an ultrasonic weld achieved with known ultrasonic welding equipment. Welders suitable for making the weld 80 include 40 kHz welders available from Branson Ultrasonics—USA. It has been discovered that high frequency welding (which occurs at approximately 40 kHz) is preferred over low frequency welding (which occurs at approximately 20 kHz), because low frequency welding tends to damage the disc data pits in the informational layers 37 and 47. Other methods of achieving the weld 80 such as laser welding might also be used. (Laser bonding may be accomplished using a turntable to hold and turn the two halves 24 and 26 while applying laser light from a commercially available laser.) However, when an ultrasonic welder is used, ultrasonic activation of the dry film adhesive 50 may also be accomplished. Thermal activation via ultrasonic energy causes intermolecular friction and, therefore, heat release in the dry film adhesive 50 which causes adhesive boundary layers 87 and 88 to melt (FIG. 8). Thus, activation of the adhesive can be accomplished simultaneously with disc welding.

In order to protect the DVD 20 from environmental contaminants, the outer peripheral edges 28 and 38 are preferably sealed with a layer 90 of UV-curable polymer. The edges 32 and 42 are similarly sealed with a layer 92 of UV-curable polymer. Suitable polymers for the layers 90 and 92 include those that are commercially available through DIC, Japan, under the product identifier SD-220.

As can be seen by the discussion above, the present invention offers a relatively simple and inexpensive method of bonding the two halves of a DVD. The present invention uses a dry film adhesive which eliminates the problems of air entrapment in liquid adhesives. Further, air removing techniques, such as employing a vacuum, may be used in the present invention to remove air between the disc halves when they are bonded. Thus, the methods and apparatus disclosed herein provide significant benefits over prior-art techniques and devices.

While the present invention has been described in what is believed to be the most preferred forms, it is to be understood that the invention is not confined to the particular construction and arrangement of the components herein illustrated and described, but embraces such modified forms thereof as come within the scope of the appended claims.

What is claimed is:

1. A disc for storing digital information, the disc comprising:
   a first sub-disc including an outer peripheral edge, a top surface, a bottom surface, and a bore having a peripheral edge;
   a second sub-disc including an outer peripheral edge, a top surface, a bottom surface, and a bore having a peripheral edge;
   a layer of dry film adhesive laminated between the first and second sub-discs and creating a bond therebetween that is substantially free of entrapped gas, the layer of dry film adhesive having an inner surface positioned near the bores of the first and second sub-discs, the inner surface spaced a distance from the peripheral edges of the bores of the first and second sub-discs; and
   a hub located between the peripheral edges of the bores of the first and second sub-discs and the inner surface of the layer of dry film adhesive, the hub consisting of an open area, free of adhesive.

2. A disc as claimed in claim 1, further comprising a weld located along the peripheral edges of the bores of the first and second sub-discs.

3. A disc as claimed in claim 2, wherein the weld is an ultrasonic weld.

4. A disc as claimed in claim 1, wherein the layer of dry film adhesive has a thickness between about 55 $\mu$m and 65 $\mu$m.

5. A disc as claimed in claim 1, further comprising an informational layer in each of the first and second sub-discs and wherein each informational layer is readable from one side of the disc.

6. A disc as claimed in claim 1, and wherein the hub is toroidally shaped and has a width dimension of about $\frac{3}{8}$".

7. A disc as claimed in claim 1, further comprising a layer of polymer on the outer peripheral edges of the first and second sub-discs.

8. A disc as claimed in claim 7, further comprising a layer of polymer on the peripheral edges of the bores of the first and second sub-discs.

9. A disc for storing digital information, the disc comprising:
   a first sub-disc including an outer peripheral edge, a top surface, a bottom surface, and a bore having a peripheral edge;
   a second sub-disc including an outer peripheral edge, a top suface, a bottom surface, and a bore having a peripheral edge;
   a layer of dry film adhesive in contact with the bottom surface of the first sub-disc and the top surface of the second sub-disc, creating a bond therebetween that is substantially free of entrapped gas, and having an inner surface positioned near the bores of the first and second sub-discs, the inner surface of the layer of dry film adhesive spaced a distance from the peripheral edges of the bores of the first and second sub-discs;
   a weld located along the peripheral edges of the bores of the first and second sub-discs; and
   a hub located between the weld and the inner surface of the layer of dry film adhesive, which is substantially free of any dry film adhesive.

10. A disc as claimed in claim 9, wherein the weld is an ultrasonic weld.

11. A disc as claimed in claim 9, wherein the layer of dry film adhesive has a thickness between about 55 $\mu$m and 65 $\mu$m.

12. A disc as claimed in claim 9, further comprising an informational layer in each of the first and second sub-discs and wherein both informational layers are readable from one side of the disc.

13. A disc as claimed in claim 9, wherein the hub is toroidally shaped and has a width dimension of about $\frac{3}{8}$".

14. A disc as claimed in claim 9, further comprising:
   a layer of polymer on the outer peripheral edges of the first and second sub-discs; and
   a layer of polymer on the peripheral edges of the bores of the first and second sub-discs.

15. A digital versatile disc comprising:
   a first sub-disc including an outer peripheral edge, a top surface, a bottom surface, and a bore having a peripheral edge;
   a second sub-disc including an outer peripheral edge, a top surface, a bottom surface, and a bore having a peripheral edge;
   a layer of dry film adhesive that is substantially transparent, substantially free of any air inclusions, in contact with the bottom surface of the first sub-disc and the top surface of the second sub-discs, and having an inner surface positioned near the bores of the first and second sub-discs, the inner surface of the layer of dry film adhesive spaced a distance from the peripheral edges of the bores of the first and second sub-discs;
   a weld located along the peripheral edges of the bores of the first and second sub-discs; and
   a hub located between the weld and the inner surface of the layer of dry film adhesive and substantially free of any dry film adhesive.

16. A digital versatile disc comprising:
   a first sub-disc including an outer peripheral edge, a top surface, a bottom surface, and a bore having a peripheral edge;
   a second sub-disc including an outer peripheral edge, a top surface, a bottom surface, and a bore having a peripheral edge;
   a layer of dry adhesive that is substantially transparent, substantially free of any air inclusions, in contact with the bottom surface of the first sub-disc and the top surface of the second sub-disc, and having an inner surface positioned near the bores of the first and second sub-discs, the inner surface of the layer of dry adhesive spaced a distance from the peripheral edges of the bores of the first and second sub-discs; and
   a hub located between the peripheral edges of the bores of the first and second sub-discs and the inner surface of the layer of dry adhesive, the hub consisting of an open area free of adhesive.

* * * * *